United States Patent
Wilkie, II et al.

(10) Patent No.: US 6,205,017 B1
(45) Date of Patent: Mar. 20, 2001

(54) SWITCHGEAR ASSEMBLY WITH FRONT ACCESSIBLE SLIDE-IN FIXED POWER SWITCH

(75) Inventors: William Edward Wilkie, II, Fletcher; Steven Dale Walker, Arden, both of NC (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/489,436

(22) Filed: Jan. 21, 2000

(51) Int. Cl.$^7$ ........................................... H02B 1/04
(52) U.S. Cl. ................ 361/605; 361/605; 361/611; 361/641; 361/832; 200/168 K; 200/50.01; 200/50.02; 174/70 B; 174/99 B; 307/151; 307/147; 439/527; 248/27.1
(58) Field of Search .................... 361/605, 611, 361/614, 624, 638–639, 648–649, 650, 622, 641, 652, 657, 645, 667, 673, 832, 807–810; 439/527, 530; 248/221.2, 220.2, 220.4, 241, 220.3, 27.1, 214; 312/223.1, 329; 220/844; 16/252, 254, 262–264, 270, 387–389; 174/66, 67, 59, 60, 70 B, 72 B; 200/168 K, 50.01, 50.02, 50 AA, 50 A, 48 R, 48 V, 485 B, 144, 166 R, 168 R; 307/151, 147

(56) References Cited

U.S. PATENT DOCUMENTS

| | | | |
|---|---|---|---|
| 3,562,593 | * | 2/1971 | Bould ................................. 317/103 |
| 3,787,713 | * | 1/1974 | Diersing et al. ....................... 317/119 |
| 3,806,768 | * | 4/1974 | Gryctko et al. ....................... 317/120 |
| 4,001,653 | * | 1/1977 | Olashaw et al. ...................... 317/119 |
| 4,118,639 | * | 10/1978 | Rosey et al. .......................... 307/147 |
| 4,121,276 | | 10/1978 | Kovatch et al. . |
| 4,532,574 | * | 7/1985 | Reiner et al. ......................... 361/365 |
| 5,535,102 | * | 7/1996 | Neill et al. ............................ 361/832 |
| 5,654,871 | * | 8/1997 | Wentler et al. ....................... 361/622 |
| 5,949,641 | | 9/1999 | Walker et al. . |
| 6,081,968 | * | 7/2000 | Walker et al. .......................... 16/252 |

* cited by examiner

*Primary Examiner*—Leo P. Picard
*Assistant Examiner*—Michael Datskovsky
(74) *Attorney, Agent, or Firm*—Martin J. Moran

(57) ABSTRACT

Power switches are fix mounted in a switchgear cabinet by providing terminal sections on power conductors at the rear face of the switch housing which extend vertically beyond the housing. The power switches slide into cells in the cabinet through a front opening with projections on the sides of the switch engaging slots in mounting panels in the cabinet. The terminal sections of the power conductors are then accessible through the front opening for connection to the buses in the switchgear cabinet. Runbacks secured to the lower power conductors on the bottom power switch extend into a rear compartment in the cabinet for the connection to power cables as the power switch is inserted into the front compartment. A unitary arc shield/wire tray slides into the front compartment above the power switches after connection of the terminal sections to the buses and is removable to provide subsequent access to the power connections.

20 Claims, 6 Drawing Sheets

SWITCHGEAR ASSEMBLY WITH FRONT ACCESSIBLE SLIDE-IN FIXED POWER SWITCH

BACKGROUND OF THE INVENTION

1. Field of the Invention

This invention relates to switchgear assemblies which house electric power switches such as circuit breakers, transfer switches and the like. More particularly, it relates to such switchgear assemblies in which the power switch is connected to the power buses in the switchgear cabinet by fixed connections.

2. Background Information

Switchgear assemblies include power switches, such as circuit breakers, transfer switches and the like, housed in metal cabinets together with sections of power buses between which the switches can be connected. In low voltage switchgear, that is 600 volts or lower, the power switches may be either draw-out mounted of fixed mounted in the metal cabinets. Draw-out mounted power switches are provided with quick disconnects on a rear face so that the power switches are automatically connected to the power buses as the switches are inserted into the cabinet from the front and automatically disconnected as they are withdrawn. Some users prefer or require that the power switches be fixed mounted, that is, secured to the power buses by fixed connections such as bolts, for instance.

In existing switchgear, there are few similarities in the assemblies and methods by which these differing constructions are mounted. The desirable goal of accommodating the same breaker arrangements despite mounting methods has for the most part not been achieved, and therefore, has historically led to different design concepts for each.

Present construction methods for fixed mounting power switches involve mounting the power switch on a bare frame or chassis utilizing holes provided in the molded power switch housing. Side accessibility is required to effect this mounting technique as well as to make the connections with the buses. As completed switchgear assemblies typically have a number of switchgear cabinets or sections arranged side by side, the side accessibility needed mandates that the power switches be installed and connected to the power buses before the units are joined side by side. This also makes it difficult to change or replace a fixed mounted power switch after the vertical sections are coupled together. The methods for changing these power switches in the field are quite involved due to the accessibility required for making the primary bus and housing connections.

There is a need, therefore, for an improved method and arrangement for fixed mounting power switches and switchgear assemblies.

More particularly, there is a need for such an improved method and apparatus which does not require side access to the vertical sections or cabinets of the switchgear assembly, so that the power switches do not necessarily have to be installed before coupling of the vertical sections.

There is a further need for such an improved method and apparatus in which the power switches can be easily removed and replaced in the field.

There is also a need for such an improved apparatus and method which also permits the power switches to be arranged in the cabinets similarly to the draw-out power switches.

SUMMARY OF THE INVENTION

These needs and others are satisfied by the invention which is directed to a switchgear assembly in which the power switches are insertable into the switchgear cabinets through front openings and the power switches have power conductors projecting rearward from the switch housing with terminal sections extending vertically beyond the housing so that they are accessible through the front opening for connection to bus members mounted in the cabinet rearward of the front openings. The bus members have sections projecting forward toward the front opening of the cabinet and vertically extending terminal sections which are secured by fixed connectors to the vertical sections of the power conductors. In a preferred arrangement, the power switches have a first set of power conductors with terminal sections extending vertically above the switch housing for connection to a first set of bus members and a second set of power conductors with terminal sections extending downward below the switch housing for connection to a second set of bus members.

Typically, the power switches are vertically stacked in a front compartment of the switchgear cabinet. Behind the front compartment is a middle compartment in which a vertical set of bus members are mounted. These vertical bus members have extensions extending forward with terminal sections extending vertically upward for engagement with the upwardly extending terminal sections of the first set of power conductors on the power switches. The bus members also include a set of runbacks with the first set extending from the rear compartment, through the middle compartment, into the forward compartment and having vertically downwardly extending terminal sections which engage the vertically downwardly extending second set of power conductors on the at least one circuit breaker. A second set of runbacks is secured to the second set of power conductors on a rear face of the bottom circuit breaker. This second set of runbacks is attached to the power switch external to the cabinet and is insertable through the front opening with the bottom circuit breaker to extend through the middle compartment and into the rear compartment for connection in the rear compartment to a set of power cables.

The means which mount the power switches in the cabinets engage the sides of the housings on the power switches and include substantially horizontal upwardly facing mounting surfaces on mounts extending along the sides of the cabinets. The power switches have downwardly facing generally horizontal mounting surfaces on the sides of the housing which engage the upwardly facing horizontal surfaces so that the power switch may slide into the cabinet through the front access opening. Preferably, these mounts comprise mounting panels that have generally horizontally extending slots forming the substantially horizontal upwardly facing mounting surfaces. The housing has substantially horizontally extending lateral projections on each side forming the downwardly facing generally horizontal mounting surfaces. These lateral projections on the housing slide into the generally horizontally extending slots in the mounting panels. The slots in the mounting panels have blind ends which form stops against which the projections on the housing seat to position the housing relative to the power buses. Preferably, these blind ends of the slots are formed by lateral offsets in the mounting panels. The mounts further include locking members engaging the mounting panels and preventing forward movement of the housing in the slots. These locking members are preferably brackets having tabs which block forward movement of the lateral projections on the housing in the side slots. Also, most preferably, the tabs on the mounting brackets extend transversely into the slots on the mounting panels and engage slits in the mounting panel extending from the slots. This mounting arrangement provides easy installation and removal, but yet provides secured mounting to resist the forces generated by short circuit currents and interruption of the same.

Accordingly, it is an object of the invention to provide a switchgear assembly with an improved arrangement for fixed-mounting of the power switches.

More particularly, it is an object of the invention to provide such switchgear in which the connections of the power conductors on the switches to the power buckles are accessible through the front opening.

Thus, it is another object of the invention to provide switchgear assembly in which the power switches can be fixed-mounted within the switchgear cabinets without the need for side access so that the power switches can be easily installed and removed without disassembling the switchgear assembly.

An additional object of the invention is to provide such switchgear in which the fixed-mounted power switches are readily slid into place within the sub-switchgear cabinets and easily and securely maintained in place.

It is still another object of the invention to provide a switchgear assembly for fix-mounted power switches, which is similar to the arrangement for draw out power switches.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
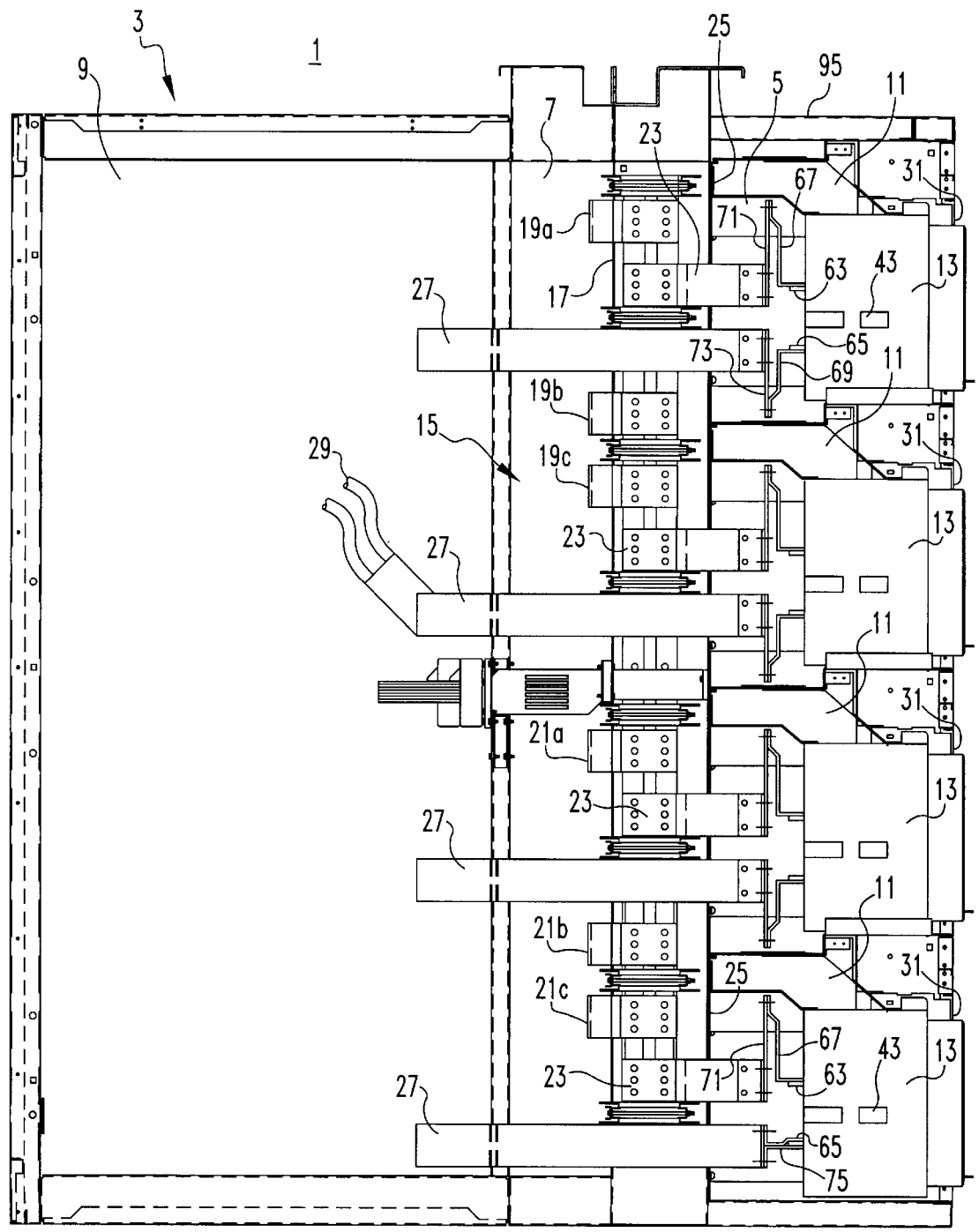
FIG. 1 is a side elevation view with side panels removed of a section of a switchgear assembly incorporating the invention.

The switchgear assembly 1 includes a metal cabinet 3 with a side panel (not shown) removed. A number of similar cabinets or sections 3 mounted side by side form the switchgear assembly 1.

The cabinet or section 3 is divided into a forward compartment 5, a middle compartment 7 and a rear compartment 9. The forward compartment 5 is divided into a number of vertically stacked cells 11 in which power switches 13 are mounted. In the exemplary switchgear assembly 1, the power switches 13 are power circuit breakers; however, other types of power switches, such as transfer switches, isolation switches and the like also can be mounted in one or more of the cells 11. Typically, the power circuit breakers 13 are three phase breakers and are connected between three phase power buses 15 including a set of vertical buses 17 mounted in the middle compartment 7. This vertical three phase bus 17 is connected to similar vertical buses in adjacent compartments by horizontal buses 19a–c and 21a–c. Each of the circuit breakers 13 is connected to the vertical bus 17 by another bus member in the form of a stab 23 which extends through a barrier 25 into the forward compartment. Each of the circuit breakers 13 is connected to a second set of bus members in the form of runbacks 27 which extend from the forward compartment 5 through the middle compartment 7 and into the rear compartment 9 where they are connected to sets of power cables such as indicated at 29.

Figure 2:
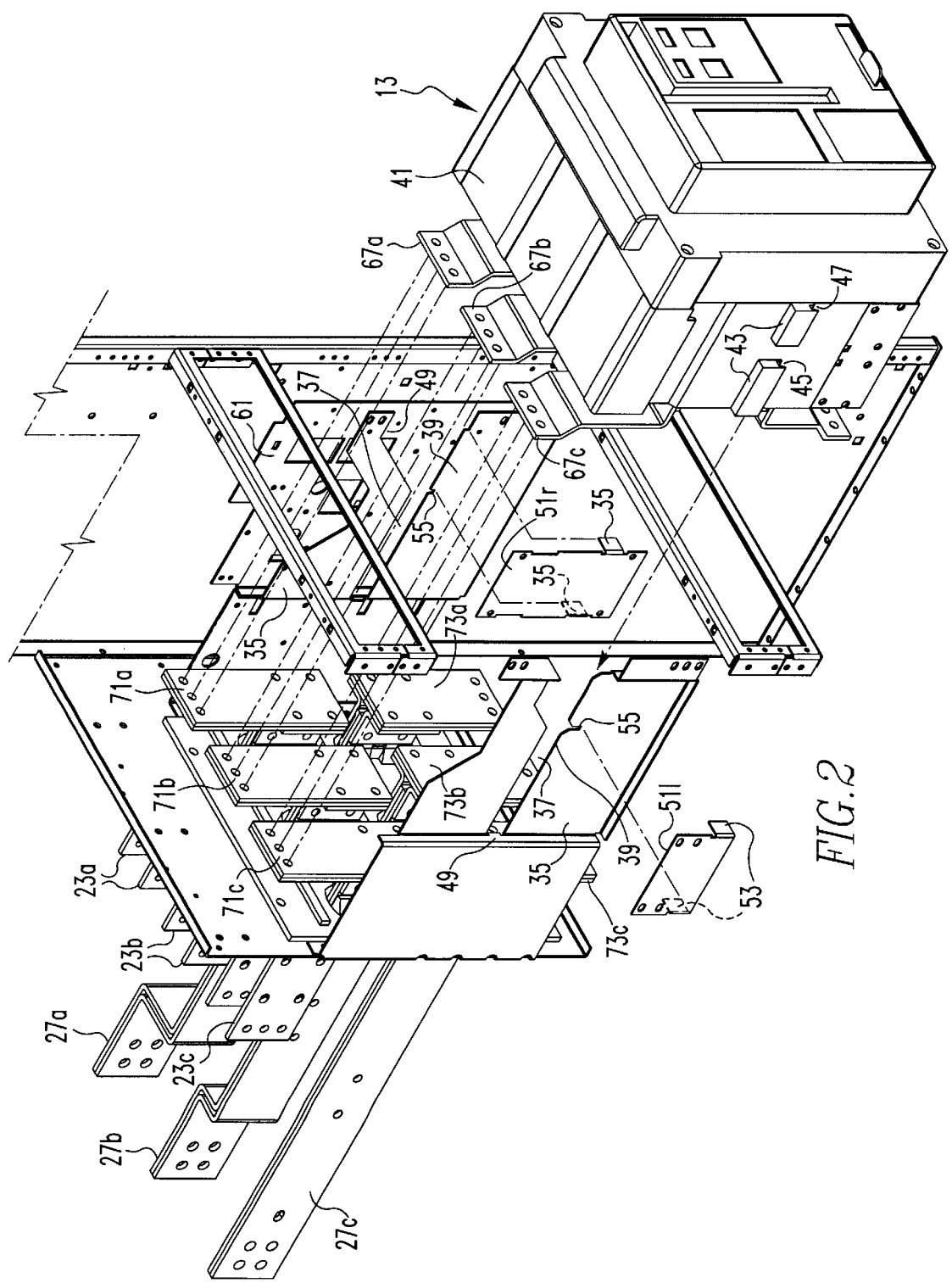
FIG. 2 is an exploded isometric view taken from the front of a portion of a switchgear assembly of FIG. 1.
Figure 3:
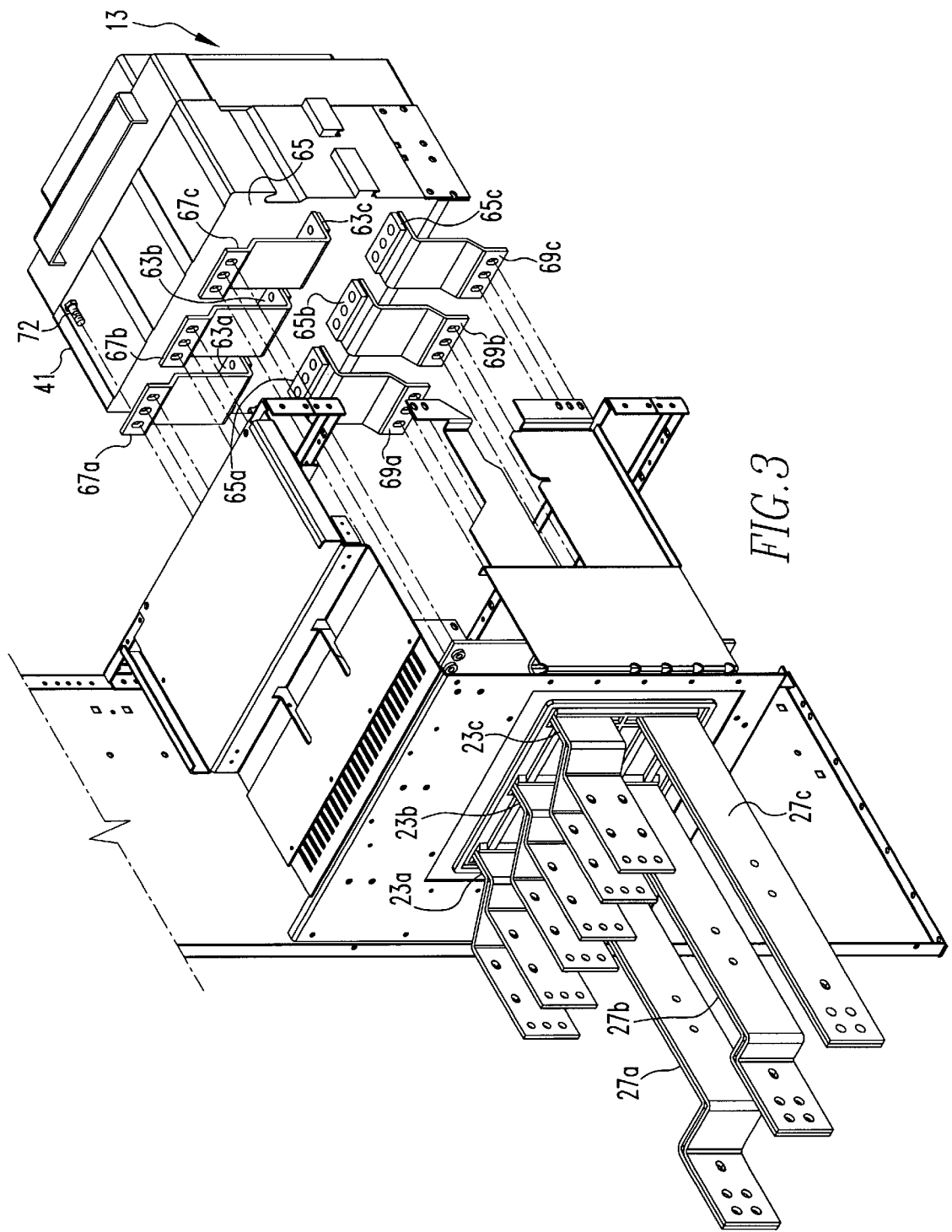
FIG. 3 is an exploded isometric view similar to FIG. 2 looking forward.

Turning also to FIGS. 2 and 3, the circuit breakers 13 are inserted into the cells 11 through front openings 31 and supported by mounts formed by sheet metal side panels 35. The side panels 35 have slots 37 extending horizontally from a front edge to form an upwardly facing generally horizontal support surface 39. The circuit breakers 13 have molded housings 41 with molded projections 43 extending laterally from each side. Groves 45 and the lower surfaces of these projections 43 form generally horizontal downwardly facing support surfaces 47 which engage and slide along the support edge 39 on the side panels 35. The slots 37 arc flared at 37f to help guide the projections 43 into the slots 37. A lateral offset 49 in the side panels 35 forms a positive rear stop for the projections 43. The projections 43 and therefore the circuit breakers are locked in place by locking brackets 51l and 51r.

Figure 5:
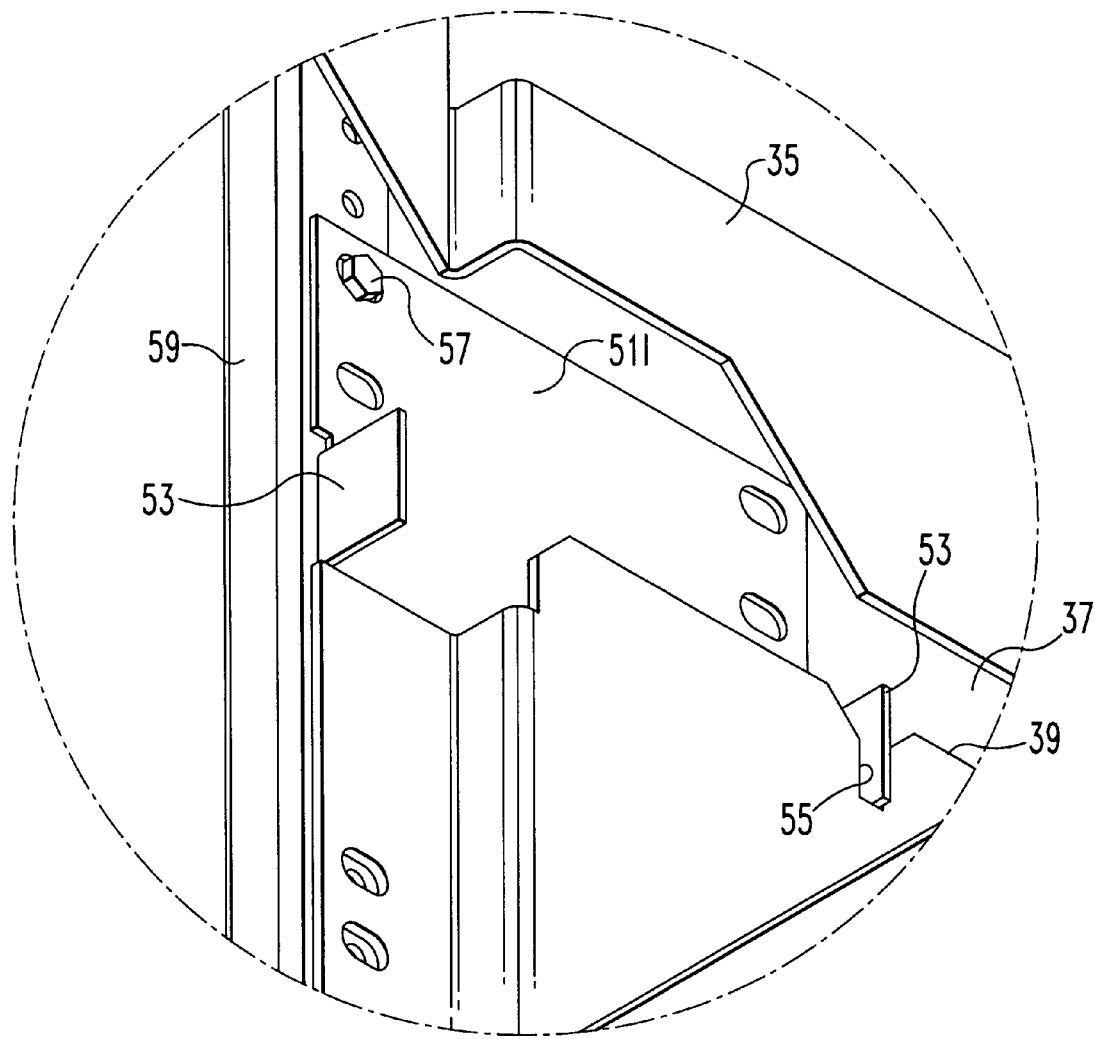
FIG. 5 is a fragmentary isometric view looking upward on engagement of a locking bracket with a mounting panel only in accordance with the invention.

As best seen in FIG. 5, the left bracket 51l is a planar member with a pair of tabs 53. The rear most tab 53 engages a slit 55 in the side panel which extends downward from the slot 37. This tab 53 is sized so that when seated in the slit 55 it extends upward to the slot 37 forming a forward stop for the projection 43 on the side of the circuit breaker housing. The locking bracket 51l is secured by screws to 57 to a vertical member 59 which is part of the switchgear cabinet 3. In a similar fashion, the locking bracket 51r has tabs 53 which engage a slit 55 in the slot 37 in the right side panel 35. The second tab 53 bears against a notch in the panel 35. This right side bracket is secured by screws (now shown) to another panel 61 which forms part of the cabinet structure. With the projections 43 thus firmly confined within the slots 37, the circuit breaker 13 is secured as shown in FIG. 6 against movement including any response to the sizable magnetic forces which can be generated during short circuit interruption.

The circuit breakers 13 are secured to the power buses 15 by fixed connections. As can be seen in FIG. 3, the circuit breakers 13 have a first or upper set of three phase power conductors 63a–63c projecting from a rear face 65 of the housing 41 and a second or lower set of three phase power conductors 65a–c. The upper conductor 63a–63c have terminal sections 67a–67c extending vertically upward beyond housing 41 (see FIG. 1). For all of the circuit breakers 13 except the lower most circuit breaker, the lower set of power conductors have terminal section 69a–69c extending vertically downward beyond the housing 41. As best seen in FIG. 2, the tabs 23a–23b connected to the vertical bus 17 similarly have terminal sections 71a–71c extending vertically upward above the housing 41 of the circuit breaker and abutting the terminal sections 67 on the upper set of power conductors of the circuit breakers. These terminal sections 65a–65c and 71a–71c have aligned apertures for fasteners 72 (only one shown) which fixedly connect the terminal sections 65a–65c to 71a–71c. Terminal section 73a–73c extending vertically downward from the runbacks 27 are similarly secured to the terminal sections 69a–69c on the lower power conductors of all of the circuit breakers except the bottom circuit breaker. As the terminal sections 67a–67c and 69a–69c are above and below, respectively, the housing 41 of the circuit breaker 13, they are accessible through the front openings 31 for securing the fastener 72. Preferably, self-retaining fasteners are retained on the terminal sections 67a–67c and 69a–69c.

Figure 4:
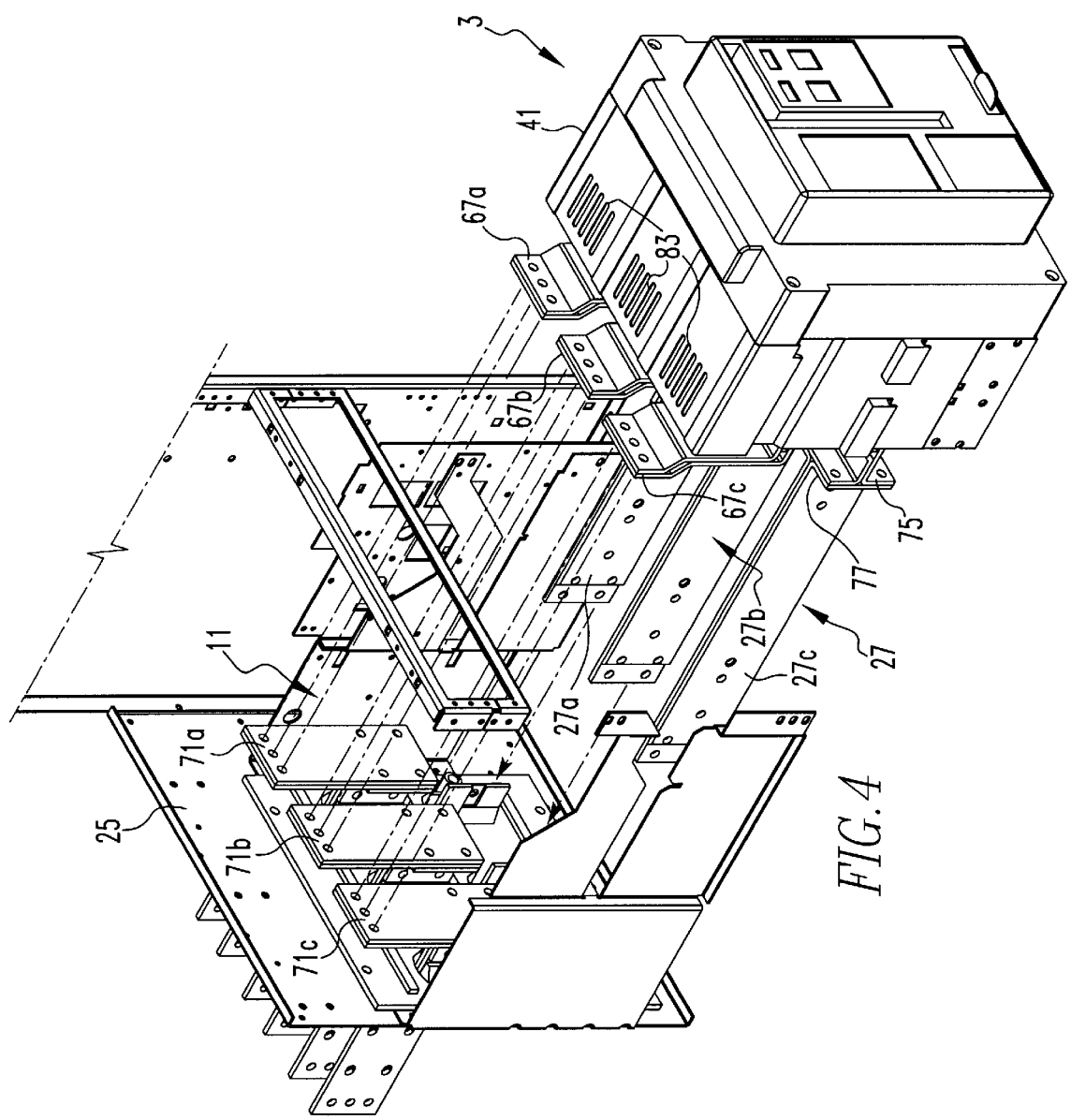
FIG. 4 is an exploded isometric view similar to FIG. 2 but showing the arrangement for installing the bottom circuit breaker.

While there can be room below the bottom most circuit breaker 13 for securing terminal sections such as 69a–69c to confronting terminal sections on the lower most runbacks 27, the space is at floor level and very difficult to operate in. Therefore, it is preferred as shown in FIG. 4 that runbacks 27a–27c be connected to the lower set of power conductors 65a–65c on the lower most circuit breaker 13, prior to insertions of the circuit breaker into the cell 11. For this purpose, a connecting member 75 secured to the power conductor 65a–65c has flanges which abut flanges 77 on the forward ends of the runbacks 27a–27c. Then, as the circuit breaker is inserted into the bottom cell 11 the runbacks 27a–27c are passed through the barrier 25 into the middle compartment 7 and extend into the rear compartment 9 as the circuit breaker seats 13 in the slots 37. The connections for the terminal sections 67a–67c on the upper set of power conductors for the lower circuit breaker are then made in the same manner as described above.

Figure 6:
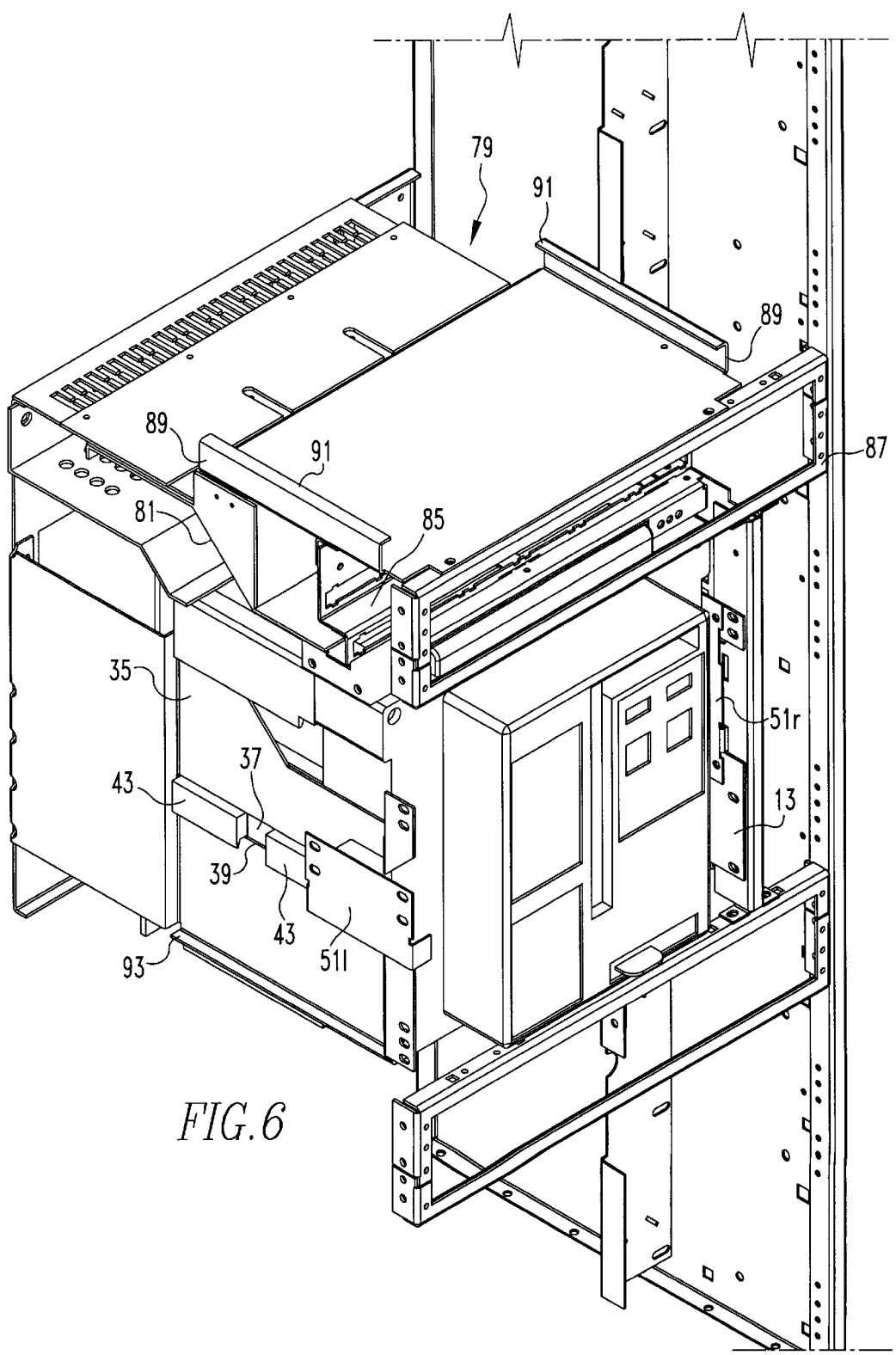
FIG. 6 is an isometric view of a circuit breaker installed in a cell of the switchgear cabinet.

The switchgear assembly 1 includes a combination arch shield/wire tray 79 above each circuit breaker 13 as shown in FIG. 6. An example of such a device is described in commonly known U.S. patent application Ser. No. 09/325,514 filed on Jun. 3, 1999 and titled "Combined Arc Shield/Wire Tray for Switchgear and Switchgear Assemblies Incorporating Same". The arc shield section 81 disperses arc gases which are exhausted through arc vents 83 (see FIG. 4) in the circuit breaker housing 41 during interruption of short circuit currents. The forward wire tray section 85 houses terminations for the secondary or control wiring (not shown) for the circuit breaker 13 which is made accessible through access doors 87 in the front of the circuit breaker. These unitary arc shield/wire trays 79 must be easily removable to gain access to the fixed connections between the circuit breaker power conductors and the buses. Accordingly, the sheet metal combined arc shield/wire trays 79 are provided with upwardly extending flanges 89 on either side with inwardly directed terminal flanges 91. These terminal flanges 91 engage outwardly directed support flanges 93 on the lower edge of the side panel 35 in the cell 11 above. The unitary arc shield/wire tray 79 for the upper most cell 11 can be removed through a movable top panel 95 on the forward compartment 5 (see FIG. 1).

The invention provides an installation for fixed mounting circuit breakers in switchgear which requires minimum modifications from a typical draw out circuit breaker arrangement. It provides for sliding the fixed mounted circuit breakers into the respective cells in the switchgear forward compartment and for locking them securely in place. Most importantly, it provides for easy access through the front opening through which the circuit breaker is installed for securing the power conductors on the circuit breaker to the switchgear buses. In a preferred arrangement, the runback for the lower set of power conductors on the rear face of the circuit breaker can be secured to the circuit breaker before insertion into the switchgear cabinet. While in the preferred embodiment, this is only done with the bottom circuit breaker, it should be evident that any or all of the other circuit breakers in the vertical stack can also have the runback mounted before installation.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A switchgear assembly comprising:

a cabinet having a front opening;

bus members mounted in said cabinet spaced rearward of said front opening;

at least one power switch having a housing and power conductors projecting rearward from said housing with terminal sections extending vertically beyond said housing;

mounting means for mounting said at least one power switch inside said cabinet between said front opening and said bus members, with said terminal sections of said power conductors accessible through said front opening for manual connection to said bus members with said power switch positioned in said cabinet; and wherein said bus members include sections projecting forward toward said front opening and vertically extending terminal sections which are connected to said vertical sections of said power conductors.

2. The switchgear assembly of claim 1 wherein said power conductors include a first set of power conductors having first terminal sections projecting vertically upward beyond said housing and accessible above said housing through said front opening for connection to a first set of said bus members.

3. The switchgear assembly of claim 2 wherein said power conductors include a second set of power conductors having second terminal sections projecting vertically downward beyond said housing and accessible from below said housing through said front opening for connection to a second set of said bus members.

4. The switchgear assembly of claim 1 wherein said power conductors include a second set of power conductors having second terminal sections projecting vertically downward beyond said housing and accessible from below said housing through said front opening for connection to a second set of said bus members.

5. A switchgear assembly comprising:

a cabinet having a front opening;

bus members mounted in said cabinet spaced rearward of said front opening;

at least one power switching having a housing and power conductors projecting rearward from said housing with terminal sections extending vertically beyond said housing;

mounting means mounting said at least one power switch inside said cabinet between said front opening and said bus members, with said terminal sections of said power conductors accessible through said front opening for manual connection to said bus members with said circuit breaker positioned in said cabinet; and wherein said mounting means comprise mounts engaging sides of said housing.

6. The switchgear assembly of claim 5 wherein said mounts include substantially horizontal upwardly facing mounting surfaces on each side of said cabinet and said housing has downwardly facing substantially horizontal mounting surfaces on sides of said housing which engage said upwardly facing horizontal surfaces of said mounts.

7. The switchgear assembly of claim 6 wherein said mounts further comprise mounting panels having substantially horizontally extending slots forming said substantially horizontal upwardly facing mounting surfaces, said housing having substantially horizontally extending lateral projections on each side forming said downwardly facing generally horizontal mounting surfaces, said lateral projections being slideable into said generally horizontally extending slots in said mounting panels.

8. The switchgear assembly of claim 7 wherein said lateral projections on sides of said housing have upwardly extending grooves in a bottom surface forming said downwardly facing substantially horizontal mounting surfaces.

9. The switchgear assembly of claim 7 wherein said generally horizontally extending slots in said mounting panels have blind ends which form stops against which said lateral projections on said housing seat to position said housing relative to said bus members.

10. The switchgear assembly of claim 9 wherein said blind ends of said slots are formed by lateral offsets in said mounting panels.

11. The switchgear assembly of claim 10 wherein said locking members comprise brackets having tabs which block forward movement of said lateral projections on said housing in said slots.

12. The switchgear assembly of claim 11 wherein said tabs extend transversely into said slots and engage slits in said mounting panel extending from said slots.

13. The switchgear assembly of claim 7 wherein said cabinet further includes at least one of an arc shield and a wiring tray mounted above said power switch and having first mounting flanges thereon, and said mounting panels having second mounting flanges engaged by said front mounting flanges for sliding said at least one of an arc shield and wiring tray in and out through said front opening to provide access to said terminal sections.

14. The switchgear assembly of claim 1 wherein said cabinet further includes at least one of air arc shield and a wiring tray mounted above said power switch and said mounting means includes means for inserting and removing at least one of said arc shield and wire tray through said front opening to provide access to said terminal sections.

15. A method of mounting a power switch in a front compartment of a switchgear cabinet having a front opening and connecting the power switch to buses extending forward into the forward compartment said methods comprising the steps of:
  installing terminal sections on a first set of power conductors at a rear face of the power switch so that they extend vertically above the housing;
  inserting the power switch into the front compartment of the switchgear cabinet through said front opening; and
  connecting said terminal sections on said first set of power conductors to said buses by access through said front opening.

16. The method of claim 15 wherein said step of installing terminal sections further comprises installing terminal sections on a second set of power conductors at said rear face of said power switch to extend vertically below the housing, and said step of connecting further includes connecting said terminal sections of said second set of power conductors to said buses by access through said front opening.

17. The method of claim 15 wherein said step of inserting includes inserting an arc shield through said front access opening into said cabinet above said power switch after said terminal sections have been connected, and removing said arc shield through said front opening to gain access to said terminal sections.

18. The method of claim 7 wherein said cabinet includes a rear compartment behind said front compartment and wherein said step of providing terminal sections includes mounting runbacks on a second set of power conductors at said rear face of said power switch, and said inserting step includes insert said power switch with said runbacks into said cabinet with said runbacks extending rearward into said rear compartment.

19. A switchgear assembly comprising:
  a cabinet having a front opening;
  bus members mounted in said cabinet spaced rearward of said from opening;
  at least one power switch having a housing and power conductors projecting rearward from said housing with terminal sections extending vertically beyond said housing;
  mounting means mounting said at least one power switch inside said cabinet between said front opening and said bus members, with said terminal sections of said power conductors accessible through said front opening for manual connection to said bus members with said circuit breaker positioned in said cabinet;
  wherein said cabinet has a forward compartment having a plurality of vertically stacked cells including an upper cell in which said at least one power switch is mounted and a bottom cell in which a bottom power switch is mounted, said cabinet further having a middle compartment behind said forward compartment and a rear compartment behind said middle compartment, said bus members including a first set of bus members extending vertically in said middle compartment and having extensions extending forward with terminal sections extending vertically upward for engagement with upwardly extending terminal sections of a first set of power conductors on said at least one power switch and on said bottom power switch, and said bus members including sets of runbacks with a first set of runbacks extending from said rear compartment, through said middle compartment into said forward compartment and having vertically downwardly extending terminal sections which engage a vertically downwardly extending second set of power conductors on said at least one power switch which extend below the housing of said at least one power switch, and a second set of runbacks secured to a second set of power conductors on a rear of said bottom power switch and insertable with said bottom power switch to extend through said middle compartment and into said rear compartment for connection in said rear compartment to a set of power cables.

20. A switchgear assembly comprising:
  a cabinet having a front opening;
  bus members mounted in said cabinet spaced rearward of said front opening;
  at least one power switch having a housing and power conductors projecting rearward from said housing with terminal sections extending vertically beyond said housing;
  mounting means mounting said at least one power switch inside said cabinet said front opening and said bus members, with said terminal sections of said power conductors accessible through said front opening for manual connection to said bus members with said circuit breaker positioned in said cabinet; and
  wherein said cabinet further includes at least one of air arc shield and a wiring tray mounted above said power switch and said mounting means includes means for inserting and removing at least one of said arc shield and wire tray through said front opening to provide access to said terminal.

* * * * *